July 12, 1932.  F. H. EVANS  1,866,760

VARIABLE PACE SETTER FOR AUTOMOBILES

Filed Dec. 28, 1927  3 Sheets-Sheet 2

Inventor
Frederick H. Evans
By Frank Keiper
Attorney

Inventor
Frederick H. Evans
By Frank Keiper
Attorney

Patented July 12, 1932

1,866,760

UNITED STATES PATENT OFFICE

FREDERICK H. EVANS, OF ROCHESTER, NEW YORK

VARIABLE PACE SETTER FOR AUTOMOBILES

Application filed December 28, 1927. Serial No. 243,124.

The object of this invention is to combine with a clock provided with the ordinary hour and minute hands, certain indicating devices that will be driven by an automobile as it travels along the road, which devices will indicate by their movement relative to the hour and minute hands whether the automobile is traveling at a certain pace or at a pace above or below that pace.

Another object of the invention is to provide an adjustable shift gearing to drive the pace setting indicator that will vary the angular velocity of the indicator by different settings of the gearing when the auto is traveling at the same rate of speed and to keep the angular velocity of the indicator uniform by different settings of the gearing when the auto is traveling at different rates of speed to correspond.

Another object of the invention is to provide an adjustment for the rate of travel of the indicating devices to correspond with the pace that it is desired for the automobile to adhere to. That is, the one device will follow the minute hand and the other indicating device will follow the hour hand at each and every pace at which the automobile is driven, the adjustments of the gearing being provided to vary the angular velocity of the indicating devices inversely in proportion to the speed of the automobile, thereby keeping the indicating devices in step with the hour and minute hands of the clock.

The device may also be used to check up the rate of production or feed of various machines.

In the drawings.

In the drawings like reference numerals indicate like parts.

Figure 1:
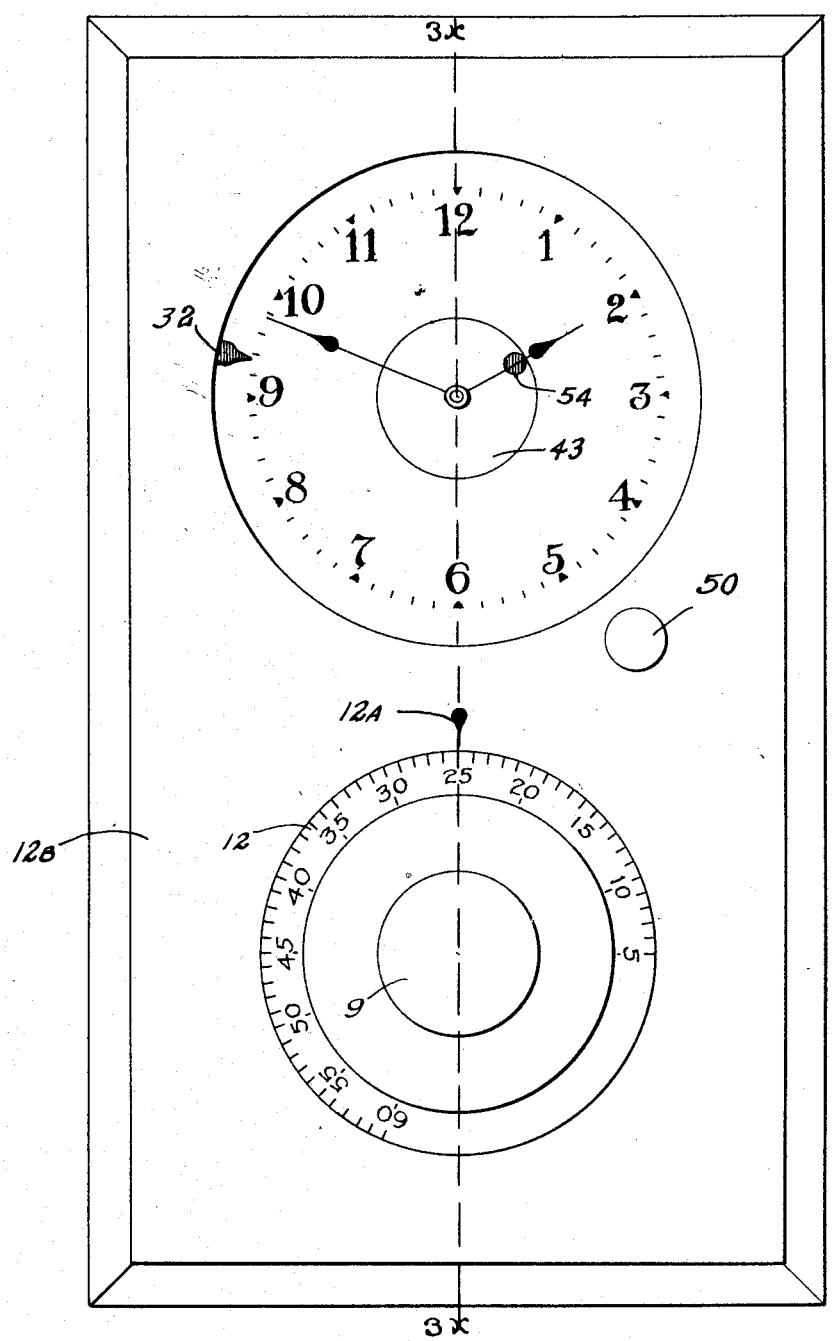
Figure 1 is a front elevation of the clock showing the clock dial with the hands and the pace setting indicators at the top, and the pace setting dial at the bottom.

In the drawings reference numeral 1 indicates a crank shaft driven by the running gear of the automobile through a flexible shaft in any suitable manner. A crank 2 on this shaft drives the connecting rod 3. The speed of the crank shaft may be reduced by any suitable gearing for the purpose of driving the connecting rod at a suitable speed or a speed that will not be excessive.

The connecting rod 3 is pivoted on a shouldered screw 4 carried on a crank 5 which is fastened to an oscillating wheel 6. This oscillating wheel has 80 teeth thereon. It is understood, however, that this number is merely the most convenient number for a particular purpose and that for other purposes, the number of the teeth on this gear wheel may be varied to suit the requirements.

Figure 3:
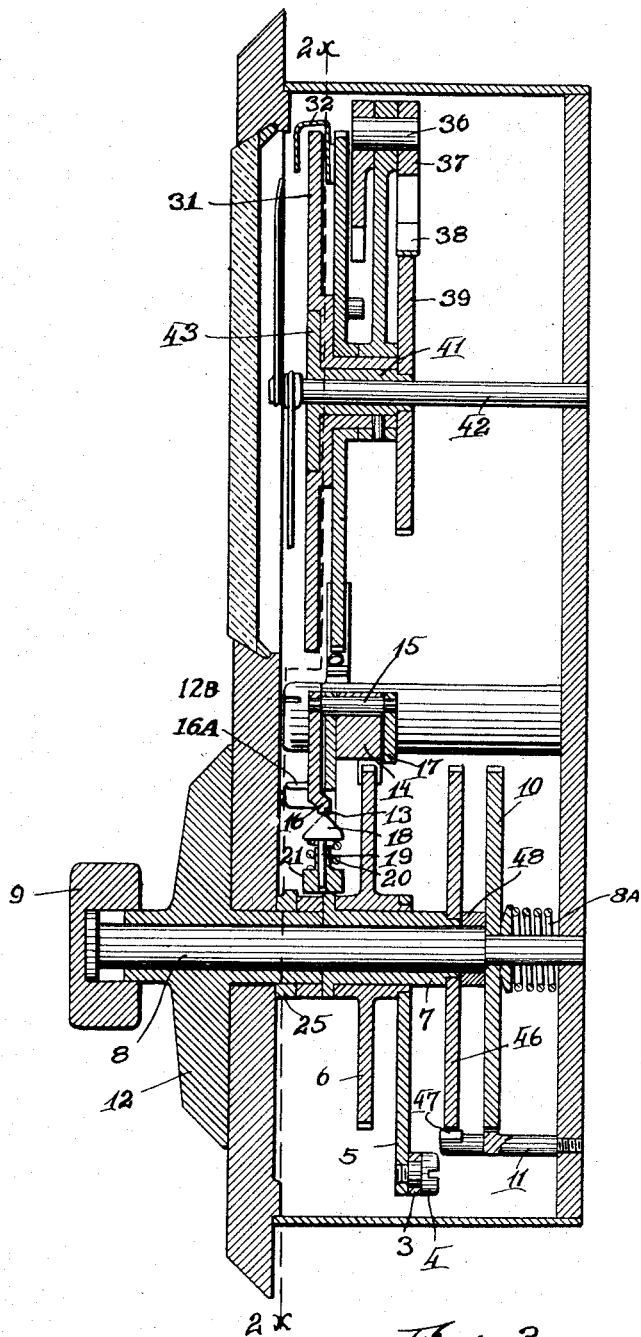
Figure 3 is a section on the line 3x, 3x of Figures 1 and 2.

It will also be understood that this gear wheel 6 oscillates through an angle that is a little more than the circular pitch of one tooth, or in this case a little more than 4.5 degrees, the object being to cause the apparatus driven thereby to advance by a step by step motion, each of which steps will be equal to one tooth of the wheel. This wheel 6 is mounted to oscillate on a sleeve 7 carried on the shaft 8. On this end of the shaft 8 is the knob 9 by which the shaft may be moved endwise and rotated. Keyed to the shaft 8 by a drive fit or otherwise is a toothed wheel 10 which can be pressed to the right in Fig. 3 by pushing on the knob 9. Below this wheel is a stationary pawl 11 which has a tooth extending up therefrom, and engages between the teeth of the wheel 10. By pushing on the knob 9 and compressing the spring 8A, the shaft 8 and wheel 10 are moved to the right in Figure 3 and the wheel 10 is cleared from the tooth on the pawl 11. This permits the wheel 10 to be turned by the knob 9 so that the position of it can be changed from time to time. Thereafter the spring 8A causes it to lock with the pawl. There is provided a dial 12 on the rim of which are provided the numbers shown in the circle at the bottom of Figure 1 which numbers in this case indicate miles per hour at which the pace setter is set to work. In Fig. 1 the number 25 is set below the pointer 12A painted on the case 12B at the top, and this indicates that the pace setter is set to work so that the indicators thereof will keep even with the hour and minute hand of the clock when the car is driven uniformly at 25 miles per hour, and if the car is driven faster than 25 miles per hour, the pace setting indicators on the clock dial will gain on the hour and minute hands and when the car is driven slower than 25 miles per hour, the pace setting indicators will fall behind the hour and minute hands of the clock.

Figure 2:
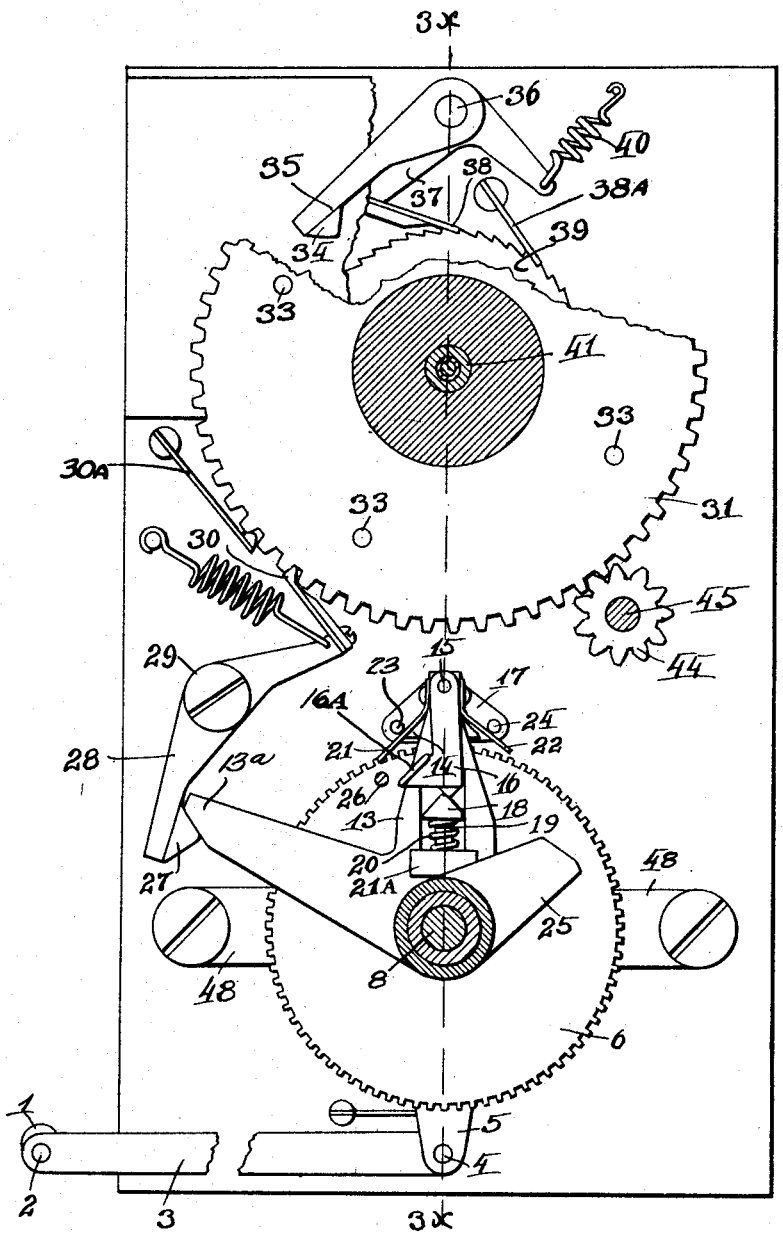
Figure 2 is a section on the lines 2x, 2x of Figure 3.

Mounted on the sleeve 7 and immediately in front of the gear 6 is the plate 13. On this plate is fastened the block 14. This block and the plate 13 form the bearing of the spindle 15. Keyed to the front end of the spindle is the arm 16 and to the back end of the spindle, the plate 17 is keyed. The arm 16 is at the bottom shaped to a point of an angle of about 90 degrees, which engages with a spring pressed detent 18 which is carried on a pin 19, which is surrounded by a spring 20. The pin 19 slides in a block 21A which is carried in the plate 13 and rotates with it, it being understood that the block 14 and the detent 18 both rotate with the plate 13 and are kept substantially in line with each other. On the block 14 are fastened the blade springs 21 and 22 which are adapted to engage with the teeth in the gear wheel 6, it being understood that only one spring at a time engages with the teeth in the gear wheel 6. These springs normally spring away from the inclined sides of the block 14 and are alternately held down against the inclined side of the block by means of the pins 23 and 24 carried on the plate 17. As long as the plate 17 remains in the position shown in Figure 2, the left hand spring will be held down by the pin 23 and will engage the teeth of the gear wheel 6. When the arm 16 swings to the other side of the detent 18, the detent 18 will be pushed up by the spring 20. The spring 20 is stronger than either the spring 21 or 22 and will, therefore, cause the pin 23 to press down the spring 21 into engagement with the teeth of the wheel 6 and permit the spring 22 to spring up away from the block following the pin 24 and moving out of engagement with the teeth on the wheel 6. As shown in Fig. 2 the plate 17 and the plate 13 will be moved to the right at the top, that is, the plate 13 will move clockwise. The arm 16 is carried around until a projection 16A thereon encounters the arm 25 and as the arm 13 is rotated the projection arm 16 is held stationary thereby so that the arm 13 moves relative thereto and also moves relative to the lower end of the arm 16 causing the lower end of the arm 16 to swing past the top of the detent 18. This reverses the engagement of the springs 21 and 22 with the teeth of the gear wheel 6. As the arm 25 is placed by the dial 12, the position of the arm 25 will engage the arm 16 early or late to correspond with the setting of the dial. That is, the gear wheel 6 will move the arm 13 to the right through an angle equal to 25 teeth of the gear wheel 6, on the completion of which the plate 17 will be reversed and the gear wheel 6 will then cause the arm 13 to move in the opposite direction. Thereafter the arm 13 will move the same distance in the opposite direction until the projection 16A of the arm 16 engages the fixed stop 26 carried on the frame of the instrument causing the plate 17 to move in the opposite direction. This cycle is repeated indefinitely as long as the car runs, and as long as the setting of the dial remains at 25. If the dial is set at 30 then 30 teeth of the wheel 6 will oscillate to move the arm 13 first in the one direction and then in the other. The plate 13 carries a projection 13A to the left (Fig. 2) which engages a cam 27 on the lever 28 pivoted at 29 on the frame of the mechanism. The other end of this lever is provided with a spring pawl 30 that engages with the teeth of the gear wheel 31 which is moved uniformly in one direction by the pawl 30. The wheel 31 is held against movement otherwise by the pawl 30A. It will be understood that the pawl 30 moves the wheel 31 one tooth for each complete cycle of movement of the arm 13. The gear wheel 31 carries the pointer 32 that presumably will keep pace with the minute hand of the clock. The gear wheel 31 carries thereon four pins 33 spaced 90 degrees apart thereon. These pins pass under the cam 34 carried on the lever 35 which lever is keyed to the shaft 36 on which is also keyed the arm 37 which carries the spring pawl 38. As the pin 33 passes under the cam 34 it moves the spring pawl 38 to the left so as to make engagement with another tooth on the ratchet wheel 39 and as soon as the pin 33 has passed beyond the cam 34, a spring 40 on the arm 37 moves the pawl 38 in the forward direction and causes the rotation of the ratchet wheel 39 so that the ratchet wheel is moved through four steps or four teeth on each complete rotation of the gear wheel 31. The pawl 38A holds the wheel against backward movement. The ratchet wheel 39 is provided with 48 teeth so that it will make one complete rotation for each 12 rotations of the gear wheel 31. The ratchet wheel 39 is keyed to the sleeve 41 which turns on the arbor 42 and on the forward side of the sleeve 41 thereof is provided the dial 43 on which is provided the indicator 54 that should keep pace with the hour hand of the pace setter.

For the purpose of setting the indicator 32, I provide a pinion 44 on the shaft 45. This pinion 44 meshes with the gear 31. The shaft 45 extends to the front of the instrument, and is provided with a knob 50 by which the pointer 32 may be turned to any desired position.

To prevent displacement of the plate 13 and the parts connected therewith during the oscillation of the gear wheel 6, I provide the following mechanism: A toothed wheel 46 is provided which is keyed to the sleeve 7. The teeth of the wheel 46 are engaged by a spring actuated detent 47 which prevents the wheel 46, the sleeve 7 and the plate 13 from turning while the pawl 21 or 22 is engaging another tooth on the wheel 6. The fixed plate 48 engages loosely on the spindle 8 and prevents the sleeve 7 from moving to the right in Figure 3 along the spindle 8.

If the auto is driven exactly at the pace desired, with the foregoing instrument installed thereon, the indicating devices 32 and 43 will move just as fast as the hour and minute hands if the adjustment of the pace setter has been correctly made.

I claim:

1. In a pace setting device for an automobile having a clock dial with an hour hand and minute hand thereon, and an indicator traveling around said dial independently of the hour and minute hand, gearing for driving said indicator around the dial by the running gear of the car at substantially the same angular velocity as the minute hand, said indicator thereby indicating that the car is running at a particular rate of speed, said gearing including a gear, means to oscillate said gear to an angle greater than the circular pitch of one tooth thereon and less than the circular pitch of two teeth thereon, a plate driven thereby through a step by step motion, each step having an angle equal to the circular pitch of one tooth, means to cause said plate to oscillate through cycles having variable numbers of steps, a gear rotated with a step by step motion by said oscillating plate, one of said steps being taken for each cycle of movement of the oscillating plate.

2. In a pace setting device for an automobile having a clock dial with an hour hand and minute hand thereon, an indicator traveling around said dial independently of the hour and minute hand, means for driving said indicator from the running gear of the auto when traveling at a uniform rate at substantially the same angular velocity as the minute hand, shiftable gearing in the driving means to vary the angular velocity of the indicator when the auto is traveling at the same rate and to keep the angular velocity of the clock hand and speed indicator equal when the auto is traveling at different rates said gearing including a gear, means to oscillate said gear to an angle greater than the circular pitch of one tooth thereon and less than the circular pitch of two teeth thereon, a plate driven thereby through a step by step motion, each step having an angle equal to the circular pitch of one tooth, means to cause said plate to oscillate through cycles having variable numbers of steps, a gear rotated with a step by step motion by said oscillating plate, one of said steps being taken for each cycle of movement of the oscillating plate.

3. In a pace setting device, a gear wheel, a connecting rod for oscillating said gear wheel through an arc equal to a little more than the circular pitch of one tooth thereon, means for driving said connecting rod from the running gear of the car, a double spring pawl engaging said wheel and driven by the oscillations thereof through a step by step motion, a pivoted plate carrying said pawl and moving therewith, stops for reversing the pawl at the end of a limited movement in both directions causing the pawls to move in the reverse direction with its plate, a gear wheel, means for rotating said gear one tooth for each cycle of movement of the plate and pawl, and an indicator carried by said gear wheel.

4. In a pace setting device, a gear wheel, a connecting rod for oscillating said gear wheel through an arc equal to a little more than the circular pitch of one tooth thereon, means for driving said connecting rod from the running gear of the car, a double spring pawl engaging said wheel and driven by the oscillations thereof through a step by step motion, a pivoted plate carrying said pawl and moving therewith, stops for reversing the pawl at the end of a limited movement in both directions causing the pawl to move in the reverse direction with its plate, a gear wheel, means for rotating said gear one tooth for each cycle of movement of the plate and pawl, and indicator carried by said gear wheel, one of said stops being variable to change the number of steps in the cycle of movement of the plate and pawl.

5. In a pace setting device for a car having a dial, an indicator traveling around said dial, gearing by which said indicator is driven by the car in proportion to its pace, said gearing being variable to cause the indicator to travel at a normal angular velocity that is predetermined by the setting of the instrument as related to the different uniform paces at which the car is driven, said gearing including a gear, means to oscillate said gear to an angle greater than the circular pitch of one tooth thereon and less than the circular pitch of two teeth thereon, a plate driven thereby through a step by step motion, each step having an angle equal to the circular pitch of one tooth, means to cause said plate to oscillate through cycles having variable numbers of steps, a gear rotated with a step by step motion by said oscillating plate, one of said steps being taken for each cycle of movement of the oscillating plate.

6. In a pace setting device for a car having a dial, an indicator traveling around said dial, gearing by which said indicator is driven by the car in proportion to its pace, said gearing being variable to cause the indicator to travel at a normal angular velocity that is predetermined by the setting of the instrument as related to the different uniform paces at which the car is driven, said normal angular velocity being substantially equal to the angular velocity of the minute hand of a clock, said gearing including a gear, means to oscillate said gear to an angle greater than the circular pitch of one tooth thereon and less than the circular pitch of two teeth thereon, a plate driven thereby through a step by step motion, each step having an angle equal to the circular pitch of one tooth, means to cause said plate to oscillate through cycles having variable numbers of steps, a gear rotated with a step by step motion by said oscillating plate, one of said steps being taken for each cycle of movement of the oscillating plate.

7. A pace setting device for a car having a gear driven by the car through a step by step movement, a plate, a pawl thereon moved by said gear through a cycle of step by step movements, means for varying the number of steps in the cycle, said means including a dial calibrated to correspond to the number of steps in each cycle by which the number of steps in each cycle is fixed.

8. A gear mechanism for a pace setting device comprising a dial, an indicator traveling around said dial, gearing by which said indicator is driven, means for giving impulses to said gearing, means for varying the ratio of the number of impulses to the angular velocity if the indicator.

9. A gear mechanism for a pace setting device comprising a dial, an indicator traveling around said dial, gearing by which said indicator is driven, means for giving impulses to said gearing, an adjustable stop for varying the ratio of the number of impulses to the angular velocity of the indicator.

10. A gear mechanism for a pace setting device comprising a dial, an indicator traveling around said dial, gearing by which said indicator is driven, means for giving impulses to said gearing, an adjustable stop for varying the ratio of the number of impulses to the angular velocity of the indicator, a dial attached to said adjustable stop, said dial being adapted to locate and fix the setting of the adjustable stop.

11. A gear mechanism for a pace setting device having a reciprocating link, a gear having a series of teeth actuated by the link, and a plate that is oscillated by said gear with a step by step movement through a cycle having a number of steps, a stop that is movable to vary the number of steps in a cycle.

12. A gear mechanism for a pace setting device having a reciprocating link, a gear having a series of teeth actuated by the link, a plate that is oscillated by said gear with a step by step movement through a cycle having a number of steps, a stop that is movable to vary the number of steps in a cycle, an indicator that receives one impulse for each cycle of movement of said plate.

13. In a pace setting device for an automobile having a clock equipped with an hour and a minute hand, and indicators traveling around said dial independently of the hour and minute hand but adjustable to keep even therewith, gearing by which said indicators are driven by an automobile in proportion to its pace, said gearing being variable to cause the indicators to keep even with the hour and minute hands when the auto is driven uniformly at a given pace and including a gear, means to oscillate said gear to an angle greater than the circular pitch of one tooth thereon and less than the circular pitch of two teeth thereon, a plate driven thereby through a step by step motion, each step having an angle equal to the circular pitch of one tooth, means to cause said plate to oscillate through cycles having variable numbers of steps, a gear rotated with a step by step motion by said oscillating plate, one of said steps being taken for each cycle of movement of the oscillating plate.

14. In a pacing device, means to drive an indicator traveling over a face of a dial, comprising the combination of a gear oscillated by an automobile in intermittent steps the number of which in a given time varies directly with the pace of the automobile, a second intermittent step-by-step mechanism operating to drive the indicator through one revolution in a fixed number of steps, and an adjustable mechanism for transmitting the intermittent steps of the gearing to the step by step mechanism that drives the indicator, each adjustment of said mechanism varying the number of steps of said automobile actuated gear necessary to produce a single step of the indicator operating mechanism.

15. In a pace setting device for an automobile having a clock with an hour and a minute hand thereon, and indicators traveling around said dial independently of the hour and minute hand, but adjustable to keep even therewith, gearing by which said indicators are driven by the automobile in proportion to its pace, said gearing being variable to cause the indicators to keep even with the hour and minute hand when the auto is driven uniformly at a given pace, said gearing including a gear, means to oscillate said gear to an angle greater than the circular pitch of one tooth thereon and less than the circular pitch of two teeth thereon, a plate driven thereby through a step by step motion, each step having an angle equal to the circular pitch of one tooth, means to cause said plate to oscillate through cycles having variable numbers of steps, a gear rotated with a step by step motion by said oscillating plate, one of said steps being taken for each cycle of movement of the oscillating plate.

In testimony whereof I affix my signature.

FREDERICK H. EVANS.